United States Patent [19]

Contento et al.

[11] Patent Number: 5,198,027
[45] Date of Patent: Mar. 30, 1993

[54] ARTICLE FOR RURAL BUILDING CONSTRUCTION AND ROAD BUILDING AND A PROCESS AND A MIXTURE FOR PREPARING THE ARTICLE

[75] Inventors: Maria P. Contento; Flavio Cioffi, both of Udine, Italy

[73] Assignee: Contento Trade s.a.s. di Cioffi Ilaria, Udine, Italy

[21] Appl. No.: 686,628

[22] Filed: Apr. 18, 1991

[30] Foreign Application Priority Data

Apr. 18, 1990 [IT] Italy ......................................... 20067

[51] Int. Cl.$^5$ .......................... C04B 7/32; C04B 7/36; C04B 40/00; C04B 9/11
[52] U.S. Cl. ..................................... 106/692; 106/694; 106/696; 106/819; 106/823; 106/400; 106/464
[58] Field of Search ............... 106/400, 464, 499, 638, 106/692, 694, 696, 819, 823, 900; 521/100; 524/650, 788, 789, 791

[56] References Cited

U.S. PATENT DOCUMENTS

| | | | |
|---|---|---|---|
| 3,965,051 | 6/1976 | Markusch et al. | 260/2.5 AK |
| 4,042,536 | 8/1977 | Dieterich et al. | 260/2.5 AK |
| 4,225,359 | 9/1980 | Schneider | 106/93 |
| 4,357,429 | 11/1982 | Blount | 521/100 |

Primary Examiner—Mark L. Bell
Assistant Examiner—Michael A. Marcheschi
Attorney, Agent, or Firm—Stevens, Davis, Miller & Mosher

[57] ABSTRACT

An article for rural building construction and road building obtained by a thermal treatment of a mixture of:

(a) at least an altered silicate containing alumina and calcium;
(b) at least a carbonatic rock;
(c) a crystallization accelerator; and
(d) optionally a basicity regulator.

11 Claims, No Drawings

ARTICLE FOR RURAL BUILDING CONSTRUCTION AND ROAD BUILDING AND A PROCESS AND A MIXTURE FOR PREPARING THE ARTICLE

FIELD OF THE INVENTION

The present invention relates to an article for rural building construction and road building and to a process for preparing the same.

BRIEF DESCRIPTION OF THE INVENTION

More particularly the present invention relates to an article essentially composed of inorganic or mineral components for rural building construction and road building, based on a mixture of inert and incoherent materials stiffened by a binder consisting of an interlacement of acicular crystals of aluminocarbonates produced "in situ".

The applicant has now found, that by carrying out the formation of crystals of such aluminocarbonates in suitable mixtures of inert, incoherent materials, which can be found easily in nature, articles are obtained characterized by excellent mechanical properties, capable of being used in the field of rural building construction and road building.

Therefore an object of the present invention relates to preparing an article for rural and road building obtained by a thermal treatment of a mixture comprising:
 (a) at least an altered silicate containing alumina and calcium;
 (b) at least a carbonatic rock;
 (c) a crystallization accelerator, and
 (d) optionally a basicity regulator.

More particularly the object of the present invention relates to an article for rural building construction and road building obtained by a thermal treatment of a mixture comprising:
 ($a_1$) 20-80% by weight of at least an altered silicate containing alumina and calcium;
 ($b_1$) 80-20% by weight of at least a carbonatic rock;
 ($c_1$) 0.1-15% by weight, with respect to $a_1+b_1$ of a crystallization accelerator; and
 ($d_1$) 0.1-15% by weight, with respect to $a_1+b_1$ of a regulator.

DETAILED DISCLOSURE OF THE INVENTION

Incorporated by reference are Italian applications 20067 A/90 and 20068 A/90 both filed on Apr. 18, 1990.

Examples of altered silicates, namely silicates, in which the hydrolysis process from atmospheric agents is just started, are: tectosilicates, phyllosilicates, inosilicates, neosilicates, sorosilicates, clays (illite), granite and the like.

Examples of carbonatic rocks are: limestone, dolomite, marble, calcite, and the like.

Any product capable of accelerating the salt crystallization can be used, urea is preferred.

As the formation of aluminocarbonates crystals is carried out in a basic medium, it is suitable that the mixture, before the thermal treatment, has a pH over 7, preferably between 9 and 12.

If use is made of a basicity regulator, it can be selected from the ones having a natural origin, such as basic metamorphic rocks or from the ones having an artificial origin, such as lime, or from the ones coming from a chemical synthesis, such as soda, ammonia and the like, which regulators are used in such amounts that they produce the above mentioned values of basicity.

The materials, which make up the article of the present invention are mixed among one another to give rise to a plastic and moldable mixture.

The water necessary to obtain the mixture is used in amounts depending on the kind of material that has been used and on granulometric distribution of the material and such water is used in amounts generally ranging between 5 and 70% by weight, referred to the whole.

The thus obtained mixture is treated thermally at not very high temperatures for times sufficient for removing the water present in excess and for accelerating the starting velocity of aluminocarbonates crystallization. The most suitable temperatures are over 30° C., preferably between 35° and 60° C.

Since the crystallization of the aluminosilicates can, however, take place, although slowly, at temperatures below 30° C. as well, articles according to the present invention can be obtained by removing the water in excess from the mixture by natural evaporation at room temperature, generally ranging between 5° and 25° C.

The article presents an ultimate tensile stress to compression at 180 days (measured according to ASTM C 39 rule) ranging between 5 and 20 MPa, ultimate tensile stress to bending at 180 days (according to ASTM C 78 rule) ranging between 1 and 4 MPa, water absorption by dipping (7 days) below 50% by weight, generally between 10 and 25%.

Articles of the invention tend to develop with time considerable mechanical resistances and therefore can be used as a layer for a road foundation or for preparing building blocks suitable for building anti-desert barriers, anti-wind barriers and so on.

A process for preparing the object of the present invention comprises:
 i) dry mixing the solid components;
 ii) kneading the solid components with water;
 iii) shaping the mixture into the desired article; and
 iv) drying the shaped article at a temperature over 30° C.

As to the present process it is very important to mix the components in the granular form with a granulometric distribution studied to reduce the empty speces in the mix to a minimum and to obtain a good degree of compaction. To obtain these results one prefers to operate with materials in granules having a diameter below 25 mm and in which up to 80% by weight of the material presents a granulometry below 0.2 mm.

A few examples will be given hereinafter by way of illustration but not of limitation, in order to better understand the present invention and to put the same into practice.

EXAMPLE 1

100 g of dry powder of clay (illite), 400 g of powder of ground granite, 480 g of limestone, 10 g of nitrogenous fertilizer containing 40% of urea, 10 g of sodium hydroxide in an aqueous solution at 50% were kneaded with 500 cc of water.

The solid component of the mixture had a granulometric distribution below 5 mm and, more particularly, 35% by weight of said component had a granulometry below 0.2 mm.

Then the mixture was tamped into a cylindrical die having a diameter of 100 mm and being 100 mm high, afterwards it was treated thermally for 4 hours at 55° C.

in a dry environment and for 4 hours at 55° C. in an environment having a humidity over 60%.

Then the die was opened and the material was kept for 60 days at 20° C. in an environment having a humidity over 60%.

At compression test the thus treated sample showed a resistance of 1.6 MPa.

EXAMPLE 2

Example 1 was repeated by using, as variant, 470 g of limestone.

The obtained sample showed a resistance to compression of 2.3 MPa.

EXAMPLE 3

Example 1 was repeated by using, as variant, 20 g of calcium hydroxide instead of sodium hydroxide.

The obtained sample showed a resistance to compression of 2.5 MPa.

EXAMPLE 4

Example 1 was repeated by using, as variant, 460 g of ground limestone.

The obtained sample showed a resistance to compression of 2.8 MPa.

We claim:

1. A mixture for use in rural building construction and road building comprising:
   (a) 20–80% by weight of an altered silicate containing alumina and calcium;
   (b) 80–20% by weight of a carbonatic rock;
   (c) 0.1–15% by weight with respect to a+b of a crystallization accelerator; and
   (d) optionally 0.1–15% by weight of a basicity regulator selected from the group consisting of metamorphic rocks, lime, soda and ammonia.

2. A mixture according to claim 1 wherein the altered silicate is selected from the group consisting of tectosilicates, phyllosilicates, inosilicates, neosilicates, sorosilicates, clays (illite) and granite.

3. A mixture according to claim 1 wherein the carbonatic rock is selected from the group consisting of limestone, dolomite, marble and calcite.

4. A mixture according to claim 1 wherein the crystallization accelerator is urea.

5. A mixture according to claim 1 having a pH over 7.

6. A process for preparing a shaped article comprising:
   i) dry mixing the following solid components:
   (a) 20–80% by weight of an altered silicate containing alumina and calcium;
   (b) 80–20% by weight of a carbonatic rock;
   (c) 0.1–15% by weight with respect to a+b of a crystallization accelerator; and
   (d) optionally 0.1–15% by weight of a basicity regulator selected from the group consisting of metamorphic rocks, lime, soda and ammonia;
   ii) kneading the solid components with water;
   iii) shaping the mixture into a shaped article; and
   iv) drying the shaped article at a temperature of greater than 300° C.

7. The process according to claim 6 wherein the shaped article has a compression strength after 180 days (measured according to ASTM C 39) comprising between 5 and 20 MPa, a bending strength after 180 days (measured according to ASTM C 78) comprising between 1 and 4 MPa, and water absorption, by dipping (7 days), below 50% by weight.

8. The process of claim 6 wherein the solid components are granules having a diameter below 25 mm and in which up to 80% by weight of the material presents granulometry below 0.2 mm.

9. A shaped article for rural construction and road building, containing a binder material of interlaced acicular crystals of aluminocarbonate, said binder formed in situ by the process comprising:
   a) mixing:
      i) 20–80% by weight of an altered silicate containing alumina and calcium;
      ii) 80–20% by weight of a carbonatic rock;
      iii) 0.1–15% by weight with respect to a+b of a crystallization accelerator;
      iv) 5–70% by water weight with respect to the mixture and;
      (v) optionally 0.1–15% by weight of a basicity regulator selected from the group consisting of metamorphic rocks, lime, soda and ammonia;
   b) kneading the mixture;
   c) shaping the mixture into a desired article; and
   d) drying the shaped article at a temperature between 35° and 60° C.

10. The article of claim 9 having a compression strength after 180 days (measured according to ASTM C 39) comprising between 5 and 20 MPa, a bending strength after 180 days (measured according to ASTM C 78) comprising between 1 and 4 MPa, and water absorption, by dipping (7 days), below 50% by weight.

11. The article of claim 9, wherein the solid components are mixed in the granular form with diameter below 25 mm and in which up to 80% by weight of the material presents a granulometry below 0.2 mm.

* * * * *